US011605286B1

(12) United States Patent
Uy

(10) Patent No.: US 11,605,286 B1
(45) Date of Patent: Mar. 14, 2023

(54) ALERT GENERATION ALGORITHM FOR TRACKING DEVICES

(71) Applicant: X Development LLC, Mountain View, CA (US)

(72) Inventor: Grant Uy, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/508,302

(22) Filed: Oct. 22, 2021

(51) Int. Cl.
*G08B 23/00* (2006.01)
*G06F 16/9538* (2019.01)
*G06F 16/9537* (2019.01)

(52) U.S. Cl.
CPC ......... *G08B 23/00* (2013.01); *G06F 16/9537* (2019.01); *G06F 16/9538* (2019.01)

(58) Field of Classification Search
CPC ...................................................... G08B 23/00
See application file for complete search history.

(56) References Cited

U.S. PATENT DOCUMENTS

| 11,299,185 | B2 * | 4/2022 | Aufderheide | ........... G06F 16/29 |
| 11,436,911 | B2 * | 9/2022 | Trainor | ................... G08B 31/00 |
| 2011/0078089 | A1 | 3/2011 | Hamm et al. | |
| 2015/0074458 | A1 * | 3/2015 | Atluri | ................. G06F 11/1471 |
| | | | | 714/19 |
| 2016/0044451 | A1 | 2/2016 | Marth | |
| 2018/0253366 | A1 | 9/2018 | Graham et al. | |
| 2020/0322430 | A1 | 10/2020 | Pradhan et al. | |
| 2021/0231815 | A1 * | 7/2021 | Hunnicutt | ............. H04W 4/029 |

FOREIGN PATENT DOCUMENTS

WO  2017197409 A1  11/2017

OTHER PUBLICATIONS

International Search Report and Written Opinion for Application No. PCT/US2022/044363 dated Dec. 21, 2022 (13 pages).

* cited by examiner

*Primary Examiner* — Travis R Hunnings
(74) *Attorney, Agent, or Firm* — Botos Churchill IP Law

(57) ABSTRACT

An alert system is configured to track conditions for a tracking system. The one or more processors of the alert system are configured to receive data in a payload related to characteristics of tracking devices of the tracking system. The one or more processors are then configured to determine a condition timeframe for each condition for a given alert based on the data in the payload. The given alert requires at least a first condition and a second condition of the plurality of conditions. The one or more processors are configured to perform a query for historical data for the first condition based on a timestamp of the second condition that is prior to the first condition, determine an alert timeframe for the given alert based on the condition timeframes and the historical data, and store the given alert and the alert timeframe in a memory of the alert system.

20 Claims, 6 Drawing Sheets

500A

500B

ALERT GENERATION ALGORITHM FOR TRACKING DEVICES

BACKGROUND

The Internet of Things (IoT) is the inter-networking of physical objects, such as products, packages, vehicles, buildings, etc., that are embedded with electronic components for network connectivity. The embedded components enable objects to detect others, be detected by others, collect data and/or transmit data. In some examples, the embedded components may include tags or labels attached to the physical objects. These tags or labels may be passive or active. The inter-networking capabilities may be leveraged for tracking locations of physical objects.

BRIEF SUMMARY

Aspects of the disclosure provide for an alert system for tracking a plurality of conditions for a tracking system. The alert system includes a memory configured to store alert data and one or more processors. The one or more processors are configured to receive data related to characteristics of a plurality of tracking devices of the tracking system, the data including a payload of one or more measurements; determine a condition timeframe for each condition for a given alert based on the data in the payload, the given alert requiring at least a first condition and a second condition of the plurality of conditions; perform a query for historical data for the first condition based on a timestamp of the second condition that is prior to the first condition; determine an alert timeframe for the given alert based on the condition timeframes and the historical data, the alert timeframe being a timeframe in which all requisite conditions for the given alert are met; and store the given alert and the alert timeframe in the memory.

In one example, the one or more processors are also configured to perform, as part of the condition timeframe determination, a first query for historical data based on when a condition is most recently false. In another example, the timestamp of the second condition is an earliest timestamp of any of a set of conditions required by the given alert. In a further example, the one or more processors are also configured to select the timestamp as a lower time bound for a condition timeframe determined for the given alert. In this example, the queried-for historical data is optionally data between the lower time bound and an earliest timestamp of each condition required for the given alert. Further in this example, the queried-for historical data optionally includes data between the timestamp of the second condition and an earliest timestamp of the first condition.

In yet another example, the alert timeframe is an intersection of the condition timeframes after they are updated based on the historical data. In a still further example, the memory is accessible by a client computing device. In another example, the one or more processors are further configured to send the given alert to a client computing device.

Other aspects of the disclosure provide for a method of tracking a plurality of conditions for a tracking system. The method includes receiving, by one or more processors, data related to characteristics of a plurality of tracking devices of the tracking system, the data including a payload of one or more measurements; determining, by the one or more processors, a condition timeframe for each condition for a given alert based on the data in the payload, the given alert requiring at least a first condition and a second condition of the plurality of conditions; performing, by the one or more processors, a query for historical data for the first condition based on a timestamp of the second condition that is prior to the first condition; determining, by the one or more processors, an alert timeframe for the given alert based on the condition timeframes and the historical data, the alert timeframe being a timeframe in which all requisite conditions for the given alert are met; and storing, by the one or more processors, the given alert and the alert timeframe in a memory.

In one example, the determining of the condition timeframe includes performing a first query for historical data based on when a condition is most recently false. In another example, the timestamp of the second condition is an earliest timestamp of any of a set of conditions required by the given alert. In a further example, the method also includes selecting, by the one or more processors, the timestamp as a lower time bound for a condition timeframe determined for the given alert. In this example, the queried-for historical data is optionally data between the lower time bound and an earliest timestamp of each condition required for the given alert. Further in this example, the queried-for historical data optionally includes data between the timestamp of the second condition and an earliest timestamp of the first condition.

In yet another example, the alert timeframe is an intersection of the condition timeframes after they are updated based on the historical data. In a still further example, the method also includes sending, by the one or more processors, the given alert to a client computing device.

Further aspects of the disclosure provide for a non-transitory, tangible computer-readable storage medium on which computer readable instructions of a program are stored. The instructions, when executed by one or more processors, cause the one or more processors to perform a method. The method includes receiving data related to characteristics of a plurality of tracking devices of a tracking system, the data including a payload of one or more measurements; determining a condition timeframe for each condition for a given alert based on the data in the payload, the given alert requiring at least a first condition and a second condition of the plurality of conditions; performing a query for historical data for the first condition based on a timestamp of the second condition that is prior to the first condition; determining an alert timeframe for the given alert based on the condition timeframes and the historical data, the alert timeframe being a timeframe in which all requisite conditions for the given alert are met; and storing the given alert and the alert timeframe in a memory.

In one example, the determining of the condition timeframe includes performing a first query for historical data based on when a condition is most recently false. In another example, the method also includes selecting the timestamp as a lower time bound for a condition timeframe determined for the given alert. Also in this example, the queried-for historical data is optionally data between the lower time bound and an earliest timestamp of each condition required for the given alert.

DETAILED DESCRIPTION

Overview

Figure 1:
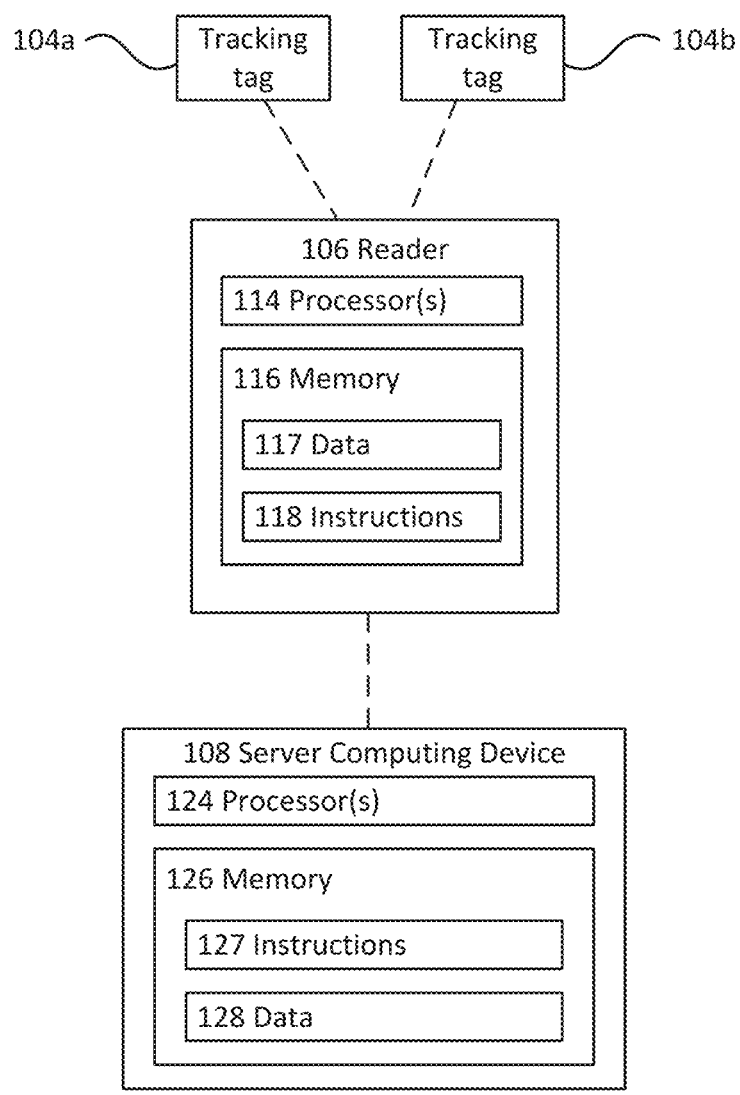
FIG. 1 is a functional diagram of an example tracking system in accordance with aspects of the disclosure.

The technology relates to an alert system for tracking a plurality of objects over time. The alert system may set alerts based on conditions and implement an algorithm for detecting the conditions from multiple independently-sampled data streams. In some cases, concurrent fulfilled conditions may trigger an alert; however, the data streams may not be received simultaneously. Being able to manage and monitor the multiple independent data streams in an efficient manner allows for as close to "real-time" detection as possible.

The alert system may include one or more server computing devices configured to track characteristics of the tracking devices in a tracking system for one or more alerts based on a plurality of conditions. The characteristics may include temperature, location, motion, battery conditions, trip/asset conditions, and/or other detectable characteristics of the tracking devices. The plurality of conditions may include at least one condition for each characteristic, such as a minimum, a maximum, a threshold, a duration, or a geofence.

The server computing devices may receive data related to the characteristics and the plurality of conditions and may determine one or more timeframes that individual conditions for a given alert are met. The one or more timeframes may be determined by checking when the measurements in the received data satisfy a given characteristic condition. The received data in a given payload may be checked first. When a given timeframe is open-ended, where an edge timestamp from the given payload is one of the bounds of the given timeframe, a first query of historical data may be initiated for a most recent timestamp where the given characteristic condition is not satisfied. The historical data may be stored in a database accessible to the server computing devices. Based on the received data and the retrieved historical data, a timeframe may be determined for the given characteristic condition.

The server computing devices may perform a query for additional data based on a selected timestamp. The selected timestamp may be the earliest edge timestamp of the determined one or more timeframes. The queried-for additional data may include data from between the selected timestamp and an earliest retrieved timestamp in a given timeframe for a given condition, if any. The server computing devices may determine an alert timeframe based on the one or more timeframes and the additional data. The alert timeframe is the timeframe in which all of the requisite conditions for a given alert are met.

Based on the determined alert timeframe, an alert may be stored in a database. Furthermore, one or more adjustments related to the tracking system may be performed based on the alert. An adjustment may be to the system, the environment of the tracking device, or trip.

The alert system described herein implements a scalable method for tracking multiple streams of data for one or more alerts. When there are tens of thousands of tracking devices and/or sensors deployed in a tracking system, the alert system provides a way to monitor the large amounts of data coming in and more promptly trigger alerts. The system would work despite the data streams being received at different times or in a different order. When used in conjunction with a tracking system, the alert system increases the utility of a tracking system by providing important and relevant data in a timely manner that may allow for more efficient tracking and better care for the assets being tracked. The alert system may also still be used for single condition alerts in addition to the concurrent condition alerts.

Example Systems

FIG. 1 is a functional diagram of a tracking system 100. The tracking system 100 may include a plurality of tracking devices, such as tags 104, and a reader 106. Each tracking tag may include one or more sensors, an identifier chip (such as for radiofrequency identification), and/or a transmitting device (such as an antenna). A tracking tag may be passive, configured to activate or be powered by environmental energy, or active, configured to include a battery or other power source. A given tracking tag may be attached to or inserted into an item to be tracked, like a package, a piece of equipment, a vehicle, a warehouse section, a room, etc. The given tracking tag may emit a signal, such as using the transmitting device, to communicate data, such as one or more sensed characteristics of the given tracking tag or its environment. For example, the sensed characteristic may be a temperature, a location, motion, battery conditions, trip/asset conditions, and/or other detectable characteristics of the tracking devices or its environment.

The reader 106 may be a computing device configured to detect the signal emitted by the plurality of tracking tags 104, then store and/or transmit data related to the tracking tags. The reader 106 may include one or more processors 114, memory 116 and other components typically present in general purpose computing devices.

The one or more processors 114 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of the reader 106 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of the reader 106. Accordingly, references to a processor or computing device will be understood to include references to a collection of processors or computing devices or memories that may or may not operate in parallel.

The memory 116 stores information accessible by the one or more processors 114, including data 117 and instructions 118 that may be executed or otherwise used by the processor(s) 114. The memory 116 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 117 may be retrieved, stored or modified by processor(s) 114 in accordance with the instructions 118. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 118 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

In some implementations, the tracking system 100 may further include a central server, such as one or more server computing devices 108 accessible by the one or more processors 114 of the reader 106. In some implementations, one or more tracking devices in the tracking system 100, such as a sensor, may be configured to obtain and communicate data directly to the server computing devices 108. The server computing devices 108 may include one or more processors 124, memory 126 and other components typically present in general purpose computing devices. The one or more processors 124 may be the same or similar type as the one or more processors 114, and the memory 126 may be the same or similar type as the memory 126. The memory 126 stores information accessible by the one or more processors 124, including data 127 and instructions 128 that may be executed or otherwise used by the processor(s) 124. Data 127 and instructions 128 may be the same or similar type as the data 117 and instructions 118, respectively.

After detecting the signal of tracking tags 104, the reader 106 may transmit the data from the tracking tags to the server computing devices 108 through an existing connection or through a network. The data may be received in a series of payloads either continually or in intervals, effectively being received as a plurality of data streams. A given payload may include measurements taken at one or more timestamps.

The server computing devices 108 may be configured to track characteristics of the tracking devices for one or more alerts based on a plurality of conditions. The plurality of conditions may include at least one condition for each characteristic, such as a minimum, a maximum, a threshold, a duration, or a geofence. The conditions may be predetermined or set based on user input. For example, a first alert may be set for when (1) a temperature is greater than 10° for 30 mins and (2) the tracking device is on a trip, which may indicate overheating. A second alert may be set for when (1) no motion is detected for 10 mins, (2) 2 of 3 locations are in a geofence, and (3) the tracking device is on a trip, which may indicate delivery. A third alert may be set for when (1) a threshold amount of light is detected from inside a package and (2) the tracking device is on a trip, which may indicate unexpected opening of the package or tampering. A fourth alert may be set for when (1) a threshold amount of light is detected from inside a package and (2) 2 of 3 locations are in a destination geofence, which may indicate opening of the package after delivery or receipt.

The tracking system 100 may optionally include an application that may be installed on one or more client computing devices. Using the application, the client computing devices may access the data on the reader 106 and/or the central server 108 through a network.

Figure 2:
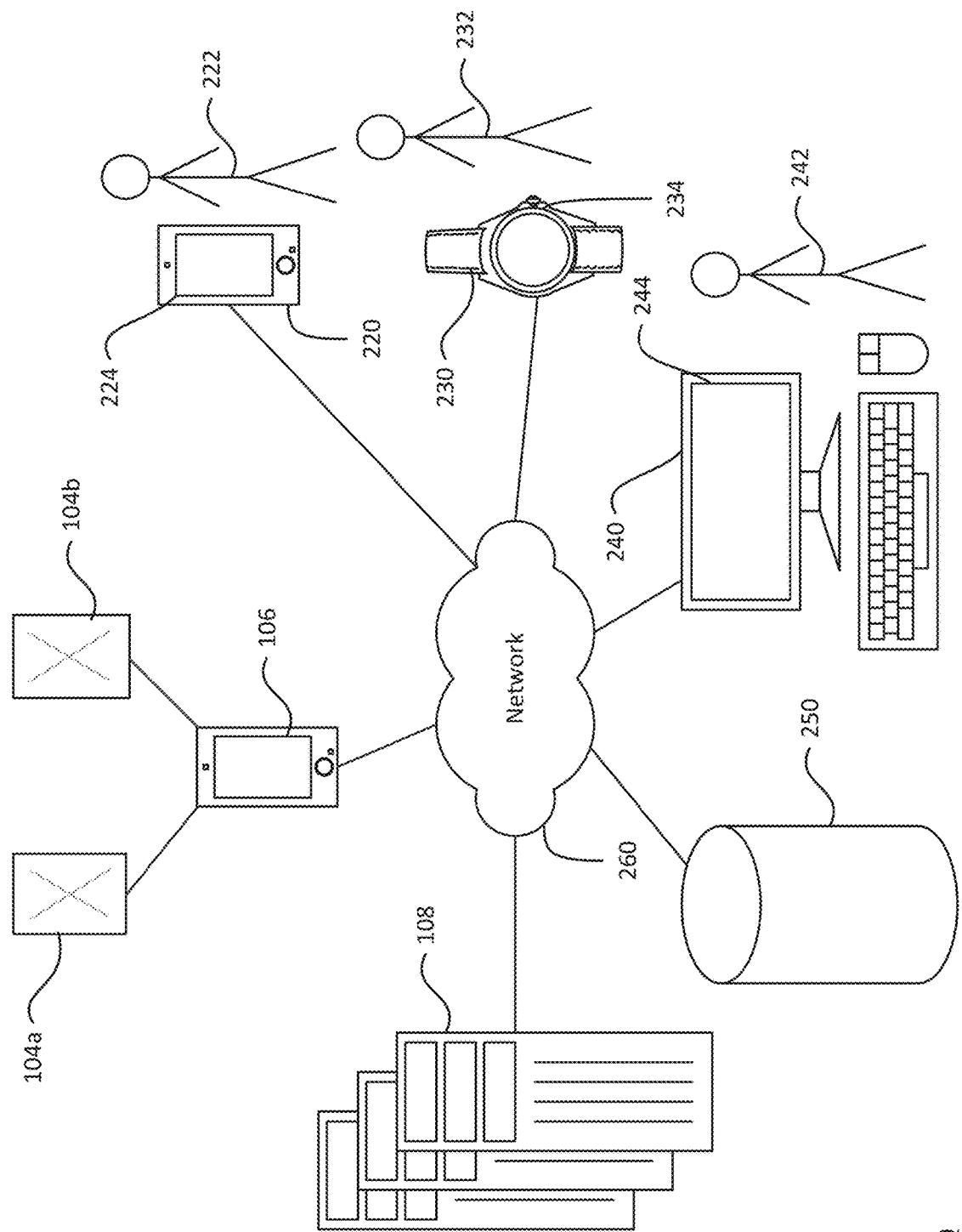
FIG. 2 is a pictorial diagram of an example network in accordance with aspects of the disclosure.
Figure 3:
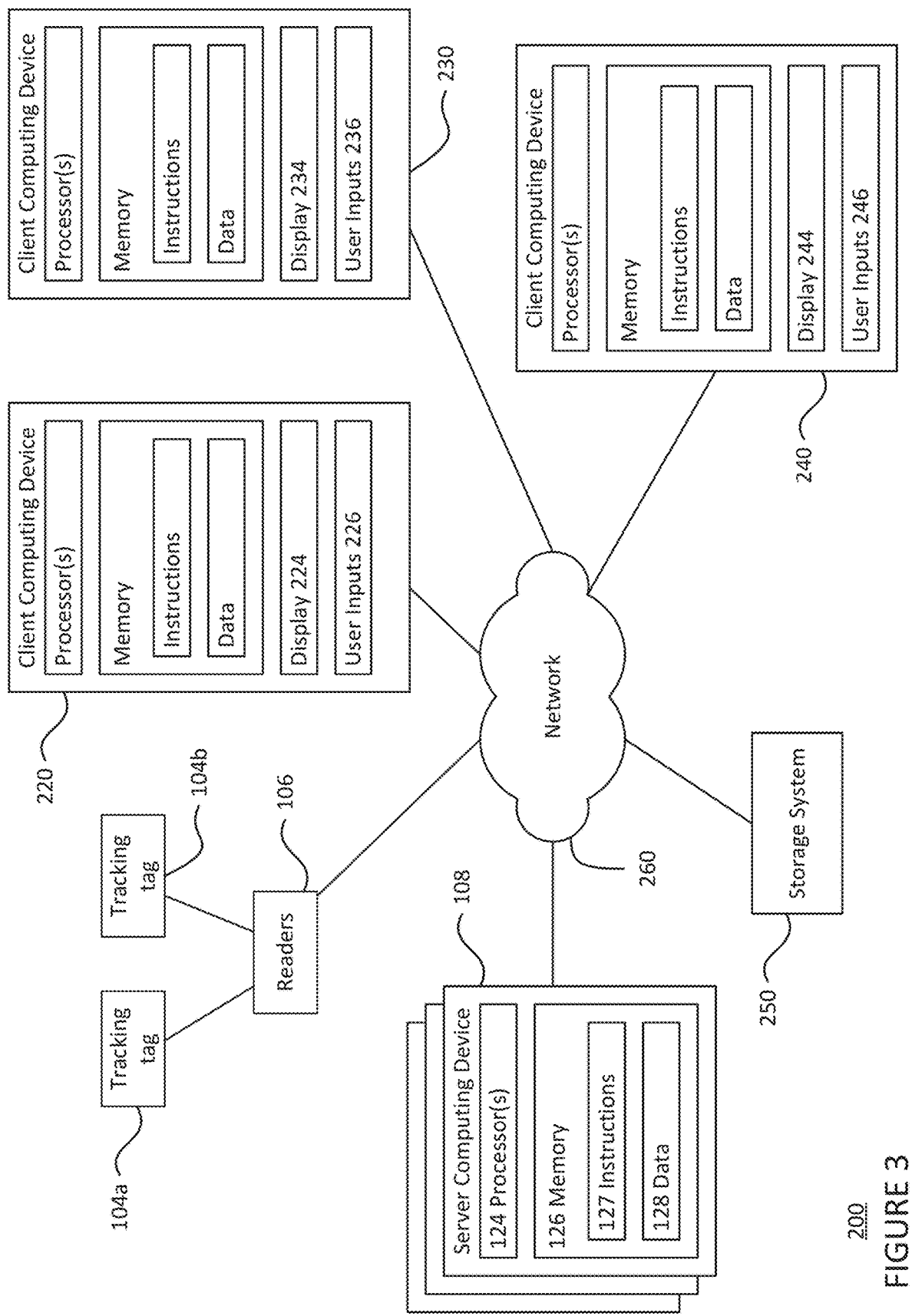
FIG. 3 is a functional diagram of the example network in FIG. 2 in accordance with aspects of the disclosure.

FIGS. 2 and 3 are pictorial and functional diagrams, respectively, of an example system 200 that includes a plurality of client computing devices 220, 230, 240 and a storage system 250 connected via a network 260. System 200 also includes tracking system 100, including tracking tags 104a, 104b, reader 106, and server computing device 108. Although only a few tags and computing devices are depicted for simplicity, a typical system may include significantly more.

Using the client computing devices, users, such as user 222, 232, 242, may view the location data on a display, such as displays 224, 234, 244 of computing devices 220, 230, 240. As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touch screen or microphone). The client computing devices may also include speakers, a network interface device, and all of the components used for connecting these elements to one another.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a wristwatch in FIG. 2. As an example, the user may input information using a small keyboard, a keypad, microphone, using visual signals with a camera, or a touch screen.

Example Methods

In addition to the operations described above and illustrated in the figures, various operations will now be described. It should be understood that the following operations do not have to be performed in the precise order described below.

Figure 4:
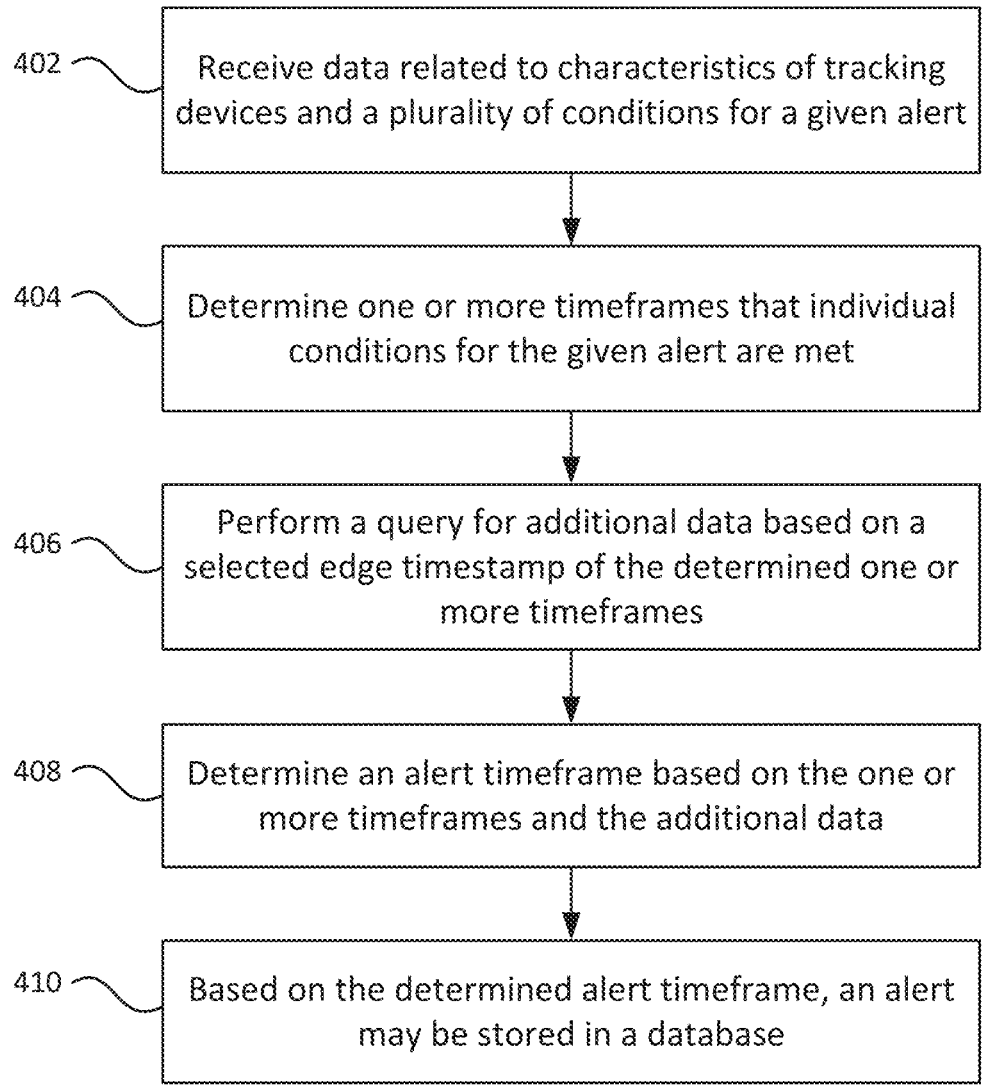
FIG. 4 is a flow diagram of an example method in accordance with aspects of the disclosure.

FIG. 4 is an example flow diagram 400 including a method for operating an alert system related to a tracking system in accordance with some of the aspects described above. The method may be performed by one or more computing devices that comprise the alert system, such as one or more server computing devices 108. While FIG. 4 shows blocks in a particular order, the order may be varied and that multiple operations may be performed simultaneously. Also, operations may be added or omitted.

At block 402, the server computing devices 108 may receive data related to characteristics of tracking devices and/or a plurality of conditions for a given alert. The data may be received from the reader 106 or alternatively directly from the tracking devices 104 in a series of payloads either continually or in intervals. Effectively, a plurality of different types of data may be received as a plurality of separate data streams. A given payload may include measurements taken at one or more timestamps.

The received data may include, for example, location data from a tracking device on a given item of the tracking system, as well as temperature data, pressure data, motion data, or light data from the tracking device or another sensor on or near the given item. The location data may be related to a geofence condition, such as an indication regarding whether the tracking device is within a set geofence. The temperature data may be a temperature measurement. The temperature data may be related to a temperature threshold condition, such as exceeding a maximum temperature or a minimum temperature. The pressure data may be a pressure measurement. The pressure data may be related to a pressure threshold condition, such as exceeding a maximum pressure or a minimum pressure. The motion data may be a detected amount of motion or a timing of when motion starts or stops. For example, the motion data may include an indication of motion starting or an indication of motion stopping. The motion data may be related to a motion detection condition, such as a whether the tracking device or tracked item is in motion or a minimum duration of motion. The light data may be an amount of light, such as a measurement of optical power from ambient light. The light data may be related to a light amount condition, such as a maximum amount of light or a minimum amount of light.

At block 404, the server computing devices 108 may determine one or more timeframes that individual conditions for the given alert are met. The one or more timeframes may be determined by checking when the measurements in the received data satisfy a given characteristic condition. In some examples, the timeframes may be determined with pessimism, which includes assuming that a given condition is satisfied in time periods between an unsatisfied measurement and a satisfied measurement. In this example, the period of time between a measurement that satisfies a given condition and the previous measurement that does not satisfy the given condition is included in the timeframe, and the period of time between a measurement that satisfies the given condition and a subsequent measurement that does satisfy the given condition is also included in the timeframe. The received data in a current payload may be checked first. For some payloads, a given timeframe for a condition may be open-ended, where a timestamp for an earliest measurement from the payload is the early, or lower, bound (or early edge timestamp) of the given timeframe. In these circumstances, a first query of historical data may be initiated for a most recent timestamp where the given characteristic condition is not satisfied. This query is performed in order to determine whether the timeframe extends beyond the early edge timestamp in the payload. The historical data may be stored in a database accessible to the server computing devices 108, such as memory 116, memory 126, or storage system 250. Based on the received data and the retrieved historical data, a timeframe may be determined for the given characteristic condition.

Figure 5A:
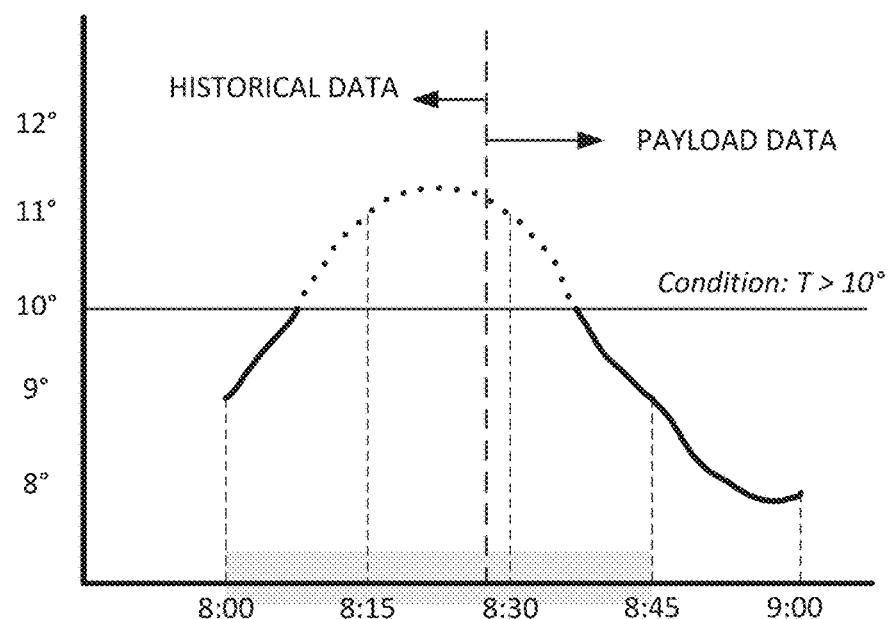
FIGS. 5A-5D are graphical representations of an example tracking method in accordance with aspects of the disclosure.

For example, as shown in graph 500A in FIG. 5A, a temperature payload received at the server computing devices may include temperature measurements 11°, 9°, and 8° from timestamps 0830, 0845, and 0900, respectively. In this case, the timeframe from 0830 and 0845 may be determined to be greater than 10°, using a pessimistic approach, the first condition for the first alert. The 0830 measurement of 11° is the earliest measurement in the temperature payload, and the 11° measurement meets a maximum temperature condition of exceeding a 10° maximum. As 0830 is an early edge timestamp from the temperature payload, a first query is initiated for a most recent timestamp for a temperature measurement that is below 10°. In the example shown in FIG. 5A, the first query may return a timestamp 0800 associated with a temperature measurement of 9°. Based on the temperature payload and the first query, the timeframe may be determined to span the period between 0800 and 0845, or the union between the payload timeframe ([0830-0845)) and the historical data timeframe ((0800-0830]).

Some conditions may require that an X out of Y measurements meet a threshold; for example, that two of three location measurements are (or are not) within a geofence. Using these X of Y conditions help compensate for possible inaccuracies in measurements, such as location measurements for the geofence condition. For such conditions, a first query of historical data may be performed when all sets of consecutive Y measurements in the payload satisfy the condition. On the other hand, if the most recent Y−X+1 do not satisfy the condition, no further query may be performed.

Figure 5B:
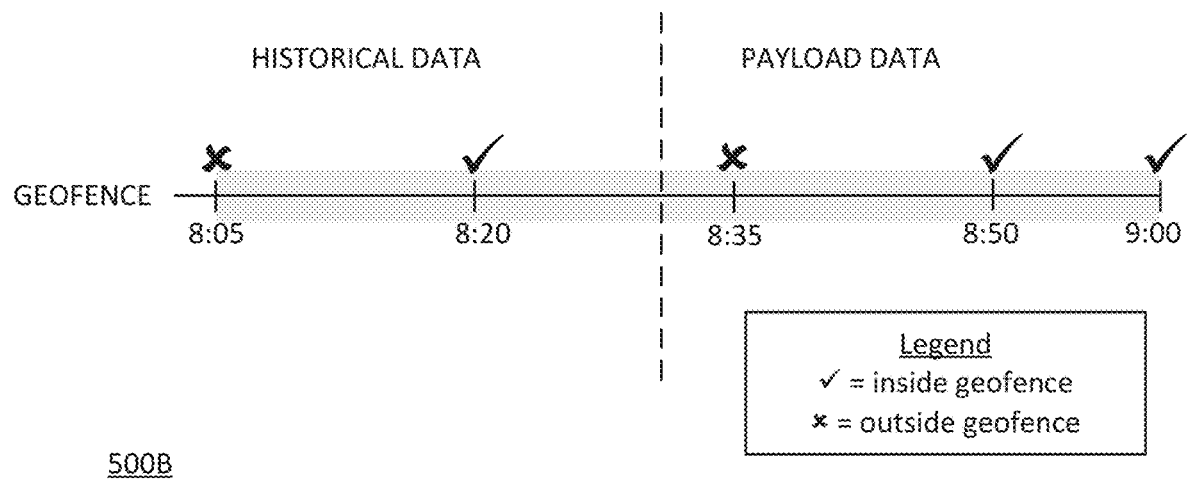

For example, as shown in graph 500B in FIG. 5B, a location payload received at the server computing devices 108 may include location measurements that is then compared with a geofence condition. The location payload includes location measurements at 0835, 0850, and 0900. The comparison may show that the location measurements in the location payload are outside, inside, and inside a set geofence, respectively. As 2 of 3 measurements are in the geofence, the 2 of 3 geofence condition is satisfied. A first query of historical location data may be performed to identify an earliest point in time where the geofence condition may be true, which in a pessimistic approach starts right after a most recent timestamp where the geofence condition is false. For instance, the first query may include measurements from 0805 and 0820 that are outside and inside of the geofence, respectively. Since the window of 0805, 0820, and 0835 fails the condition, 0805 or 08:05:01 may be the "pessimistic" earliest point at which the condition is satisfied. The timeframe that the geofence condition is true, may be the period from 0805 (non-inclusive) and ongoing at 0900.

Figure 5C:
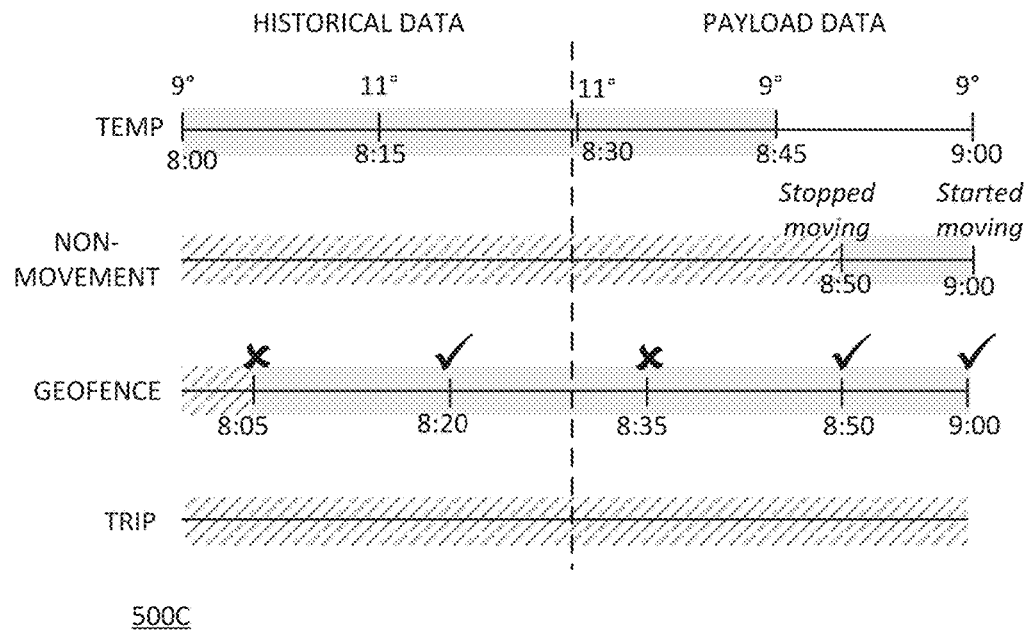

At block 406, the server computing devices 108 may perform a query for additional data based on a selected edge timestamp of the determined one or more timeframes. The selected edge timestamp may be the earliest edge timestamp of the determined one or more timeframes. In cases where the first query described above has been performed, this may be a second query. The queried-for additional data may include data from between the selected timestamp and an earliest retrieved timestamp in a given timeframe for a given condition, if any. The graph 500C in FIG. 5C shows data that is obtained from most current payloads and a first query, when applicable, as well as the timeframes for the second query (shown with hatched shading). The graph 500D in FIGURE D shows data from graph 500C with the additional data from the second query. In some cases, the additional data may include data for conditions that only require a single datapoint for a timestamp in association with other conditions. For example, trip conditions such as whether the tracking device is on a trip require only a single query for a datapoint at or near the earliest timestamp of interest based on other conditions.

Figure 5D:
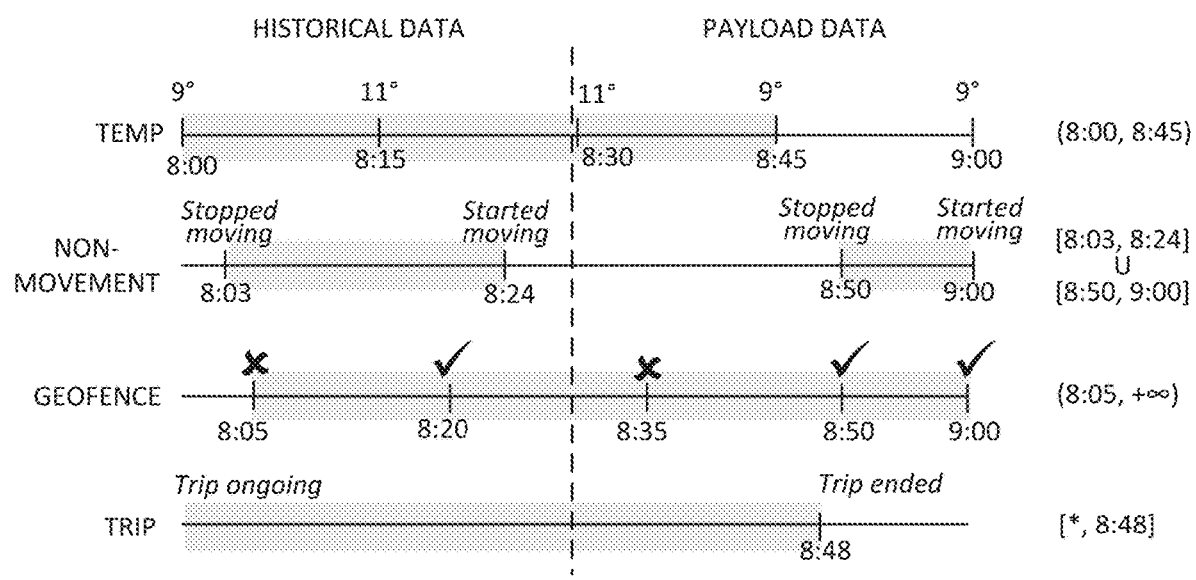

In one example, a given alert may require a temperature condition and a geofence condition. Using the data in graph 500C in FIG. 5C, the server computing devices 108 may use the payload data and a first query to determine that the temperature condition is satisfied from 0800 (non-inclusive) to 0845 (non-inclusive), and that the geofence condition is satisfied from 0805 (non-inclusive) to 0900 (inclusive and open). In this example, the timestamp 0800 may be selected as the earliest edge timestamp based on the temperature and location data shown in FIG. 5C. Additional data to be retrieved in a second query would include any location data between 0800 (the selected timestamp associated with the early edge temperature timestamp) and 0805 (the earliest timestamp for location data retrieved in the first query). As shown in FIG. 5D, there is no location data retrieved between 0800 and 0805.

In another example, a given alert may require at least a temperature condition and a non-movement condition. The non-movement condition may include a duration component, for example, that there is no motion detected for 5 minutes. Based on the payload data, the server computing devices 108 may determine the non-movement condition with the 5-minute duration component is satisfied from 0850 (inclusive), when the motion data indicates the tracking device stopped moving, and 0900 (non-inclusive), when the motion data indicates the tracking device started moving. In the example in FIG. 5C, additional data to be retrieved in a second query would include any motion data between the 0800 (the selected timestamp associated with the early edge temperature timestamp) and 0850 (the earliest timestamp for motion data retrieved in the first query). As shown in FIG. 5D, the motion data retrieved between 0800 and 0850 includes a 0803 measurement of stopped motion and a 0824 measurement of started motion. As a result of the second query, the non-movement condition is also satisfied from 0803 (inclusive) to 0824 (non-inclusive).

In other examples, a given alert may require a trip condition in addition to another condition. In these examples, the second query may also retrieve whether the tracking device or tracked item associated with the received data is on a trip from the selected timestamp, 0800, and through a duration of one or more of the other conditions. As shown in FIG. 5C, the server computing devices 108 may retrieve trip data from 0800 to a current time (illustrated by the entire range from 0800 to the current time having hatched shading), since the geofence condition is ongoing. As shown in FIG. 5D, the retrieved trip data may indicate that the trip was ongoing at 0800 and ended at 0848.

At block 408, the server computing devices 108 may determine an alert timeframe based on the one or more timeframes and the additional data. The alert timeframe is the timeframe in which all of the requisite conditions for a given alert are met. Determining the alert timeframe may include adjusting the one or more timeframes of a given condition to include older data from the additional data for the given condition. The alert timeframe may be determined by finding an intersection of the one or more timeframes, including any adjustments. In some cases, determining the alert timeline may include determining an end of a previously triggered alert based on where the requisite conditions for a given alert cease to be met. The determination of an alert timeframe may be performed for more than one alert simultaneously or sequentially using same or similar timeframes and additional data.

For example, given the data shown in FIG. 5D, the first alert based on the temperature and trip conditions may have an alert timeframe of (8:00, 8:45), or the intersection of the temperature condition timeframe (8:00, 8:45) and the trip condition timeframe [8:00, 8:48]. The second alert based on the movement, geofence, and trip conditions may have an alert timeframe of (8:05, 8:24], or the intersection of the movement condition timeframe [8:03, 8:24]∪[8:50, 9:00], the geofence condition timeframe (8:05, +∞), and the trip condition timeframe [*, 8:48].

In some cases, more than one alert timeframe may be determined based on the one or more timeframes and the additional data when more than one intersection is found. For example, in a basic temperature condition case, when a tracker exceeded a set temperature threshold between 8:00 and 8:15 as well as between 8:45 and 9:00, and the tracker uploaded a single payload with temperature data between 7:30 and 9:30 at once. Based on the single payload, the alert system would generate two separate temperature alerts; one for 8:00-8:15 and another for 8:45-9:00.

At block 410, based on the determined alert timeframe, an alert may be stored in a database. The stored alert may include the determined alert timeframe and a description of the alert. The description may be, for example, a name or a list of conditions. When the alert timeframe has an open end, the description of the alert may also include that the alert timeframe is open-ended. When the stored alert is a confirmation of reaching a destination for a trip, the server computing devices may update one or more conditions related to the trip or tracked asset to indicate that the trip is completed. The database may be accessible by a client computing device for retrieval or review.

In addition to or alternatively to storing, the alert may be sent to a client computing device as a notification. The notification may indicate the description of the alert and the alert timeframe.

Furthermore, one or more adjustments related to the tracking system may be performed based on the alert. An adjustment may be to the system, the environment of the tracking device, or trip. For example, when an alert is triggered related to temperature that is ongoing, or has an open-ended timeframe, the temperature of the environment of the tracking device at or near the temperature sensor may be may be adjusted. The temperature of the environment may be adjusted by sending instructions to an HVAC system. When an alert is triggered related to a geofence that is ongoing, an adjustment to a trip may be made, such as by providing instructions to a vehicle or driver for the trip. When an alert is triggered related to reaching a destination, the tracking device may be adjusted, such as to collect temperature measurements more frequently since the package may undergo more rapid temperature changes after delivery when manually handled.

In some alternative implementations, the first query for one or more conditions may not be performed when the one or more conditions do not have a duration requirement or an X of Y requirement. Reducing the number of queries may allow for faster or more efficient operation of the server computing devices. The relevant timeframes for these conditions would be determined when the second query is triggered.

In further alternative implementations, one or more steps of flow diagram 400 may be performed by one or more processors 114 of reader 106 or another computing device.

In other alternative implementations, a given alert may be enabled for a particular period of interest. During the set period, the given alert may store the given alert when the conditions are satisfied and/or send notifications to the client computing device for the given alert. Outside of the set period, the given alert may only store the given alert or may disabled the given alert (neither store the given alert nor send notifications). The particular period of interest may be enabled based on user input, which may or may not include input related to whether enablement includes storage and/or notifications or whether disablement includes storage of the alert. For example, the third alert may be enabled for a particular period when high-value goods are expected to be shipped, such as from October 1 to October 10. The user input related to enabling the third alert for the particular period may include both storage and notification of the third alert, and the user input related to disabling the third alert (such as outside of the particular period) may include storage of the third alert.

The alert system described herein implements a scalable method for tracking multiple streams of data for one or more alerts. When there are tens of thousands of tracking devices and/or sensors deployed in a tracking system, the alert system provides a way to monitor the large amounts of data coming in and more promptly trigger alerts. The system would work despite the data streams being received at different times or in a different order. When used in conjunction with a tracking system, the alert system increases the utility of a tracking system by providing important and relevant data in a timely manner that may allow for more efficient tracking and better care for the assets being tracked.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An alert system for tracking a plurality of conditions for a tracking system, the alert system comprising:
   a memory configured to store alert data; and
   one or more processors configured to:
      receive data related to characteristics of a plurality of tracking devices of the tracking system, the data including a payload of one or more measurements;
      determine a condition timeframe for each condition for a given alert based on the data in the payload, the given alert requiring at least a first condition and a second condition of the plurality of conditions;
      perform a query for historical data for the first condition based on a timestamp of the second condition that is prior to the first condition;
      determine an alert timeframe for the given alert based on the condition timeframes and the historical data, the alert timeframe being a timeframe in which all requisite conditions for the given alert are met; and
      store the given alert and the alert timeframe in the memory.

2. The alert system of claim 1, wherein the one or more processors are further configured to perform, as part of the condition timeframe determination, a first query for historical data based on when a condition is most recently false.

3. The alert system of claim 1, wherein the timestamp of the second condition is an earliest timestamp of any of a set of conditions required by the given alert.

4. The alert system of claim 1, wherein the one or more processors are further configured to select the timestamp as a lower time bound for a condition timeframe determined for the given alert.

5. The alert system of claim 4, wherein the queried-for historical data is data between the lower time bound and an earliest timestamp of each condition required for the given alert.

6. The alert system of claim 5, wherein the queried-for historical data includes data between the timestamp of the second condition and an earliest timestamp of the first condition.

7. The alert system of claim 1, wherein the alert timeframe is an intersection of the condition timeframes after they are updated based on the historical data.

8. The alert system of claim 1, wherein the memory is accessible by a client computing device.

9. The alert system of claim 1, wherein the one or more processors are further configured to send the given alert to a client computing device.

10. A method of tracking a plurality of conditions for a tracking system, the method comprising:
    receiving, by one or more processors, data related to characteristics of a plurality of tracking devices of the tracking system, the data including a payload of one or more measurements;
    determining, by the one or more processors, a condition timeframe for each condition for a given alert based on the data in the payload, the given alert requiring at least a first condition and a second condition of the plurality of conditions;
    performing, by the one or more processors, a query for historical data for the first condition based on a timestamp of the second condition that is prior to the first condition;
    determining, by the one or more processors, an alert timeframe for the given alert based on the condition timeframes and the historical data, the alert timeframe being a timeframe in which all requisite conditions for the given alert are met; and
    storing, by the one or more processors, the given alert and the alert timeframe in a memory.

11. The method of claim 10, wherein the determining of the condition timeframe includes performing a first query for historical data based on when a condition is most recently false.

12. The method of claim 10, wherein the timestamp of the second condition is an earliest timestamp of any of a set of conditions required by the given alert.

13. The method of claim 10, further comprising selecting, by the one or more processors, the timestamp as a lower time bound for a condition timeframe determined for the given alert.

14. The method of claim 13, wherein the queried-for historical data is data between the lower time bound and an earliest timestamp of each condition required for the given alert.

15. The method of claim 14, wherein the queried-for historical data includes data between the timestamp of the second condition and an earliest timestamp of the first condition.

16. The method of claim 10, wherein the alert timeframe is an intersection of the condition timeframes after they are updated based on the historical data.

17. The method of claim 10, further comprising sending, by the one or more processors, the given alert to a client computing device.

18. A non-transitory, tangible computer-readable storage medium on which computer readable instructions of a program are stored, the instructions, when executed by one or more processors, cause the one or more processors to perform a method, the method comprising:
    receiving data related to characteristics of a plurality of tracking devices of a tracking system, the data including a payload of one or more measurements;

determining a condition timeframe for each condition for a given alert based on the data in the payload, the given alert requiring at least a first condition and a second condition of the plurality of conditions;

performing a query for historical data for the first condition based on a timestamp of the second condition that is prior to the first condition;

determining an alert timeframe for the given alert based on the condition timeframes and the historical data, the alert timeframe being a timeframe in which all requisite conditions for the given alert are met; and storing the given alert and the alert timeframe in a memory.

19. The storage medium of claim 18, wherein the determining of the condition timeframe includes performing a first query for historical data based on when a condition is most recently false.

20. The storage medium of claim 18, wherein the method further comprises selecting the timestamp as a lower time bound for a condition timeframe determined for the given alert; and wherein the queried-for historical data is data between the lower time bound and an earliest timestamp of each condition required for the given alert.

* * * * *